United States Patent
Golobrodsky et al.

(10) Patent No.: US 10,324,949 B2
(45) Date of Patent: Jun. 18, 2019

(54) METHOD AND SYSTEM FOR CONSOLIDATING DATA RETRIEVED FROM DIFFERENT SOURCES

(71) Applicant: T-Jat Systems (2006) Ltd., Petah Tikva (IL)

(72) Inventors: Oleg Golobrodsky, Petach Tikva (IL); Gideon Drori, Sha'arei Tikva (IL)

(73) Assignee: PHONEMIX LTD., Petach Tikva (IL)

(*) Notice: Subject to any disclaimer, the term of this patent is extended or adjusted under 35 U.S.C. 154(b) by 270 days.

(21) Appl. No.: 14/900,190

(22) PCT Filed: Jun. 19, 2014

(86) PCT No.: PCT/IL2014/000032
§ 371 (c)(1),
(2) Date: Dec. 21, 2015

(87) PCT Pub. No.: WO2014/207735
PCT Pub. Date: Dec. 31, 2014

(65) Prior Publication Data
US 2016/0147853 A1    May 26, 2016

(30) Foreign Application Priority Data
Jun. 23, 2013   (IL) .......................... 227135

(51) Int. Cl.
*G06F 17/30* (2006.01)
*G06F 16/25* (2019.01)
(Continued)

(52) U.S. Cl.
CPC .......... *G06F 16/258* (2019.01); *G06F 16/215* (2019.01); *G06F 16/245* (2019.01); *G10L 15/005* (2013.01); *G10L 15/06* (2013.01)

(58) Field of Classification Search
CPC ...................................................... G06F 17/30
See application file for complete search history.

(56) References Cited

U.S. PATENT DOCUMENTS

| | | | |
|---|---|---|---|
| 8,117,026 B2 | 2/2012 | Lee et al. | |
| 2008/0243832 A1* | 10/2008 | Adams | G06F 17/2223 707/999.005 |

(Continued)

OTHER PUBLICATIONS

Kurman A. Mira, "Multilingual information processing on relational database architectures". Ph.D Thesis, Indian Institute of Science, pp. 1-178, Bangalore, India, Dec. 31, 2005.

(Continued)

*Primary Examiner* — Khanh B Pham
(74) *Attorney, Agent, or Firm* — Browdy and Neimark, PLLC

(57) ABSTRACT

A method is provided for consolidating data retrieved from different text records stored in different languages and associated with a single user. According to an embodiment, the method comprises the steps of: extracting a plurality of users' identifications from a plurality of text records and converting them into a corresponding plurality of speech records, each being essentially identical to the pronunciation of a corresponding user identification in a language which its respective text record has been stored; converting each speech record to a respective data record; extracting from the data records obtained, at least one group of data records comprising two or more data records essentially identical to each other; for each of the groups, retrieving information comprised in two or more text records which are stored in different languages from each other; and storing the information retrieved in a consolidated text record.

14 Claims, 1 Drawing Sheet

(51) Int. Cl.
*G06F 16/245* (2019.01)
*G10L 15/00* (2013.01)
*G06F 16/215* (2019.01)
*G10L 15/06* (2013.01)

(56) References Cited

U.S. PATENT DOCUMENTS

| | | | |
|---|---|---|---|
| 2009/0089332 A1* | 4/2009 | Harger | G06F 17/2288 |
| | | | 707/999.107 |
| 2009/0271359 A1* | 10/2009 | Bayliss | G06F 17/30303 |
| | | | 706/54 |
| 2009/0319521 A1* | 12/2009 | Groeneveld | G06F 17/30864 |
| | | | 707/999.006 |
| 2010/0022378 A1 | 1/2010 | Nguyen et al. | |
| 2013/0204880 A1* | 8/2013 | Lesiecki | G06F 17/30699 |
| | | | 707/748 |

OTHER PUBLICATIONS

Kurman A. Mira,"Multilingual information processing on relational database architectures",Current Trends in Database Technology—EDBT 2004 Workshops, Springer Berlin Heidelberg, 2005 pp. 12-23, Dec. 31, 2005.

Kurman A., Haritsa Jayant R. LexEQUAL, "Supporting multilingual matching in database systems", Advances in Database Technology—EOBT 2004, Springer Berlin Heidelburg, 2004, pp. 292-309, Dec. 31, 2004.

Elmagarmid Ahmed K., Ipeirotis Panagiotis G., Verykios Vassilios S., "Duplicate record detection: A survey", IEEE Transactions on Knowledge and Data Engineering, vol. 19, No. 1, pp. 1-16 Jan. 2007.

\* cited by examiner

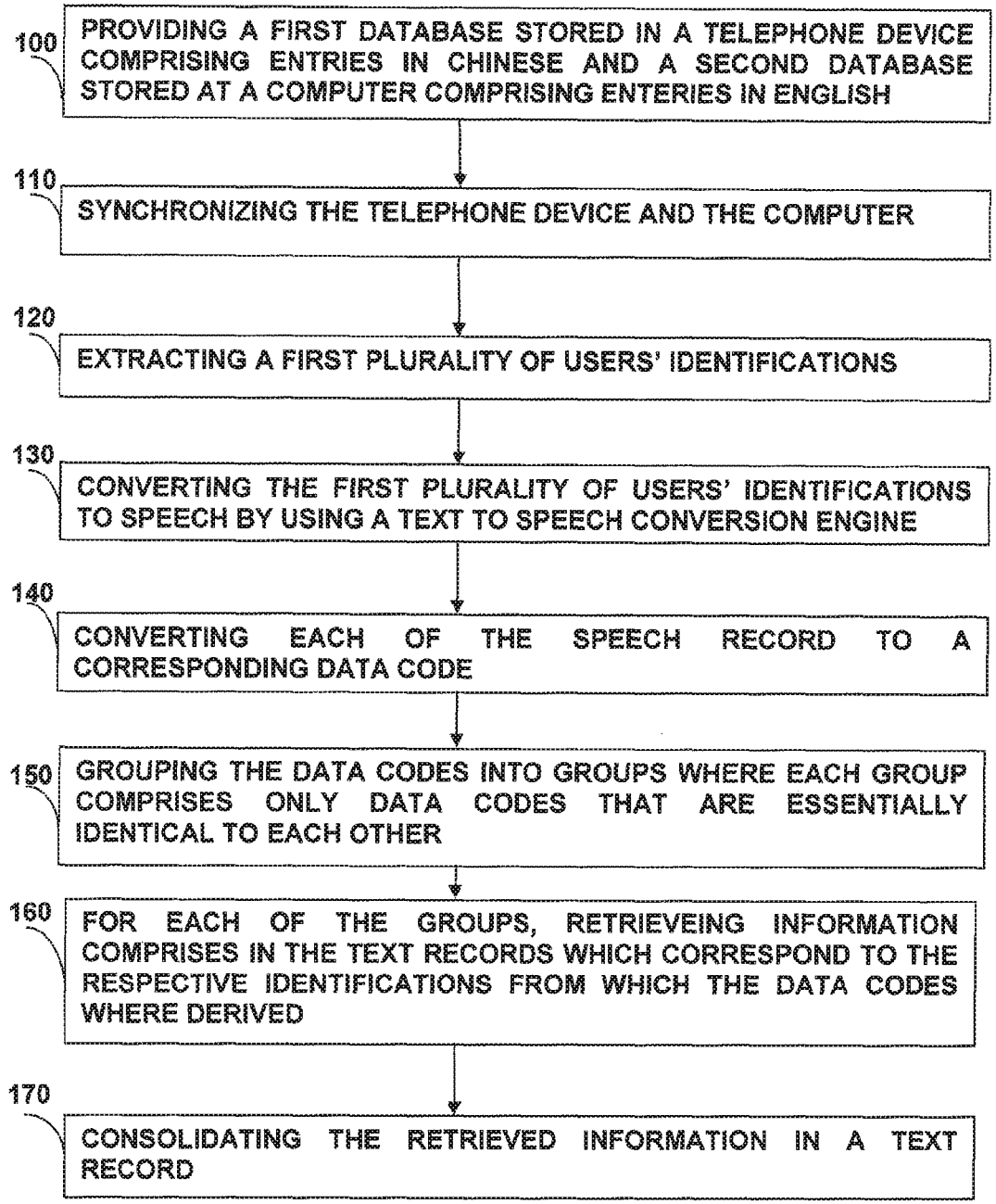

METHOD AND SYSTEM FOR CONSOLIDATING DATA RETRIEVED FROM DIFFERENT SOURCES

TECHNICAL FIELD

The present invention generally relates to merging data retrieved from various databases. More particularly, the present invention relates to a system and a method for merging data stored in different languages at various databases and retrieved therefrom.

BACKGROUND

In today's world, people and businesses retain extensive amounts of data in various databases. In addition, it is rather common nowadays for a user to be registered with a large number of software applications, by providing different user's details (such as an e-address and perhaps other associated details) in the registration process with each of these software applications. Thus, users often have different user names in various applications (which may also be defined in different formats), and receive and send messages over a variety of wired and wireless networks via a variety of devices, such as desktop computers, wired phones, wireless devices (e.g., phones and personal digital assistants ("PDAs")), and others, where certain details associated with the users' contact details are stored.

Moreover, it often happens that when a user wants to communicate with another user, not only that the details of that other user must be retrieved from a different database (e.g. depending on the medium that the user selects for establishing such a communication session), also the required information may be stored in a language different from the one currently used by that user.

Therefore, there is a need to be able to generate a consolidated text record that preferably includes all retrievable contact details for a single entry from various databases, irrespective of the language in which they were entered. However, there are several problems which limit the ability to find all the relevant data associated with an entity in various databases. Multiple data records may exist for a particular entity as a result of separate data records received from one or more information sources, which in turn leads to a problem that may be referred to as data fragmentation. In case of data fragmentation, a query of the master database may not retrieve all of the relevant information about a particular entity. In addition, as described above, the query may miss some relevant information about an entity due to a typographical error made during the entry of the data, which would lead to the problem of data inaccessibility. These problems limit the ability to locate the information for a particular entity within one or more databases.

In order to reduce the amount of data that must be reviewed, and prevent the user from picking the wrong data record, it is also desirable to identify and associate data records from various information sources that may contain information about the same entity. There are conventional systems that locate duplicate data records within a database and delete those duplicate data records, but these systems may only locate data records which are essentially identical to each other. Thus, these conventional systems cannot determine if two data records for example, entered in two different languages, contain nevertheless information about the same entity. In addition, these conventional systems do not attempt to index data records from a plurality of different information sources, and do not locate data records within the one or more information sources containing information about the same entity, to enable linking those data records together. Consequently, it would be desirable to be able to associate data records from a plurality of information sources which pertain to the same entity, despite discrepancies between attributes of these data records and to be able to assemble and present information from these various data records in a cohesive manner. However, in practice it might be extremely difficult to provide an accurate, consolidated view of information from a plurality of information sources. This is true when all the information is retrieved from sources handled in one language. The challenge is naturally even greater in cases where data records are stored in more than one language, in a number of information sources.

There are translation programs that may conduct a search for a word in the non-native language entered by the user and find its explanation in the native language. However, if the word is not presented in a written form to the user, he cannot know exactly how to spell the word. In such a case, the user cannot use usual translation software for translation. In order to overcome this problem, some solutions are described in the art which propose to employ a speech input method for the translation. Such a method uses a speech-to-text conversion engine for converting the speech into text, and then translates the converted text as if it were input text in any of the known methods for translating a text. However, the problem with such solutions is that not everyone has the same pronunciation for the same word. Thus, the converted word may not be the exact one.

US 20110022378 describes a translation method using phonetic symbol input that includes the steps of: establishing translation words in a translation database, each of the translation words having a corresponding translational explanation; entering an input message that includes at least one phonetic symbol; according to some comparison rule, comparing the input message with the translational explanation corresponding to each of the translation words and, when there is a match, loading the matched translation word from the translation database.

Still, there is a need for a solution that provides means to enable consolidating data retrieved in different languages which pertain to a single user, into one single consolidated database entry.

SUMMARY OF THE DISCLOSURE

The disclosure may be summarized by referring to the appended claims.

It is an object of the present disclosure to provide a method and system for consolidating data relating to a single entity, derived from different text records stored in different languages.

It is another object of the present invention to provide a method and system for consolidating data relating to a single entity, derived from different text records stored in different languages, after identifying the language at which the text records have been stored.

Other objects of the invention will become apparent as the description of the invention proceeds.

According to a first aspect of the disclosure there is provided a method for consolidating data retrieved from different text records each associated with a user, wherein the text records are stored in different languages in at least one database, and wherein the data that is being consolidated, pertain to a single user.

In accordance with an embodiment, the method comprising:

extracting a plurality of users' identifications (i.e. a user's characterizing feature such as a name, nickname, address, working place and the like) from a plurality of text records and converting them into a corresponding plurality of speech records by using a text to speech conversion engine, wherein each of the plurality of speech records is essentially identical to the pronunciation of a corresponding user identification in a language at which the respective text record has been stored (e.g. a digital representation of the corresponding user identification as pronounced in that language);

converting each of the speech records to a respective data record (e.g. a data code), thereby obtaining a plurality of data records;

extracting from the plurality of data records obtained, at least one group of data records, where each of the at least one group comprises two or more data records that are essentially identical to each other. As will be appreciated by those skilled in the art there could be cases where the user's identification (e.g. the user's name) may sound a bit different in two different languages, in which case the data records (codes) will probably be slightly different from each other, yet sufficiently close to each other so that they can be associated with the same group of data records, representing text records associated with a single user;

for each of the at least one group, retrieving information comprised in two or more text records associated with the two or more data records included in that group, and wherein at least two of the two or more text records are characterized in that they are stored in different languages from each other; and storing the information retrieved in a consolidated text record, thereby obtaining a consolidated text record which comprises information that pertains to one user, wherein the information has been retrieved from the two or more text records.

The term "user" as used herein throughout the specification and claims should be understood to encompass any relevant entity, such as companies, people etc.

The term "text record" as used herein throughout the specification and claims should be understood to encompass, both the identification of the respective contact (e.g. the contact name, the contact nickname, etc.) as well as information associated with that user which may be used when generating the consolidated text record. For example, the contact telephone number, the contact address in various software applications such as Facebook®, Skype®, mail, e.g. Gmail®, Yahoo® etc., residential address, mailing address, company at which the contact is employed, work address and the like. The identification of a respective contact may be also any applicable characterizing feature other than the contact name or nickname.

The term "different language" as used herein throughout the specification and claims should be understood to encompass, two different native languages as well as a language and a modified form thereof, for example, a slang version derived from an original native language.

In accordance with another embodiment, some of the plurality of text records are stored at a first database whereas other text records of the plurality of text records are stored at a second database, and wherein at least one of the groups of data records (codes) comprises one data record that is associated with a text record stored at the first database and at least one other data record of that group that is associated with a text record stored at the second database.

By yet another embodiment, some of the plurality of text records are stored in a first language whereas others of the plurality of text records are stored at a second language, and wherein at least one of the groups of data records comprises one data record that is associated with a text record stored at the first language and at least one other data record that is associated with a text record stored in the second language.

According to still another embodiment, the method provided further comprising a step of identifying the language at which at least one of the plurality of text records has been stored prior to carrying out the step of extracting the plurality of users' identifications. Preferably, the step of identifying the language comprises identifying a combination of characters comprised in one or more of the plurality of text records (e.g. a combination which is unique to a certain language).

By still another embodiment, the plurality of text records includes one text record that pertains to a selected user and the remaining text records comprise at least one other text record that pertains to the same selected user.

In accordance with another aspect, there is provided a system for consolidating data derived from different text records each associated with a user, wherein the text records have been stored in different languages in at least one database (i.e. at least one of the text records is stored in a language that is different from the language used for storing other text records), and wherein the data being consolidated pertain to a single user, the system comprising:

at least one database adapted to store a plurality of text records, each of which is associated with a specific user and comprises an identification thereof, one or more processors operative to:

extract a plurality of users' identifications from a plurality of text records and convert them into a corresponding plurality of speech records, wherein each of said plurality of speech records is essentially identical to the pronunciation of a corresponding user identification at a language at which its respective text record has been stored;

convert each of the speech records to a respective data record (e.g. a data code), thereby obtaining a plurality of data records;

extract from the plurality of data records obtained, at least one group of data records, where each of the at least one group comprises two or more data records that are essentially identical to each other;

for each of the at least one group, retrieve information comprised in two or more text records associated with the two or more data records included in that group, and wherein at least two of the two or more text records are stored in different languages from each other; and store the information retrieved in a consolidated text record, thereby obtaining a consolidated text record which comprises information pertaining to one user, that has been retrieved from the two or more text records.

By yet another embodiment, the system further comprising a user interface to enable a user to select a text record which pertains to a selected contact and wherein the plurality of text records includes at least one other text record that pertains to the same selected user.

According to another aspect there is provided a non-transitory computer-readable storage media storing one or more sequences of instructions which when executed cause one or more processors to perform:

extracting a plurality of users' identifications of different users from a plurality of text records stored at at least one database and converting them into a corresponding plurality of speech records, wherein each of the plurality of speech records is essentially identical to the pronunciation of a corresponding user identification at a language which its respective text record has been stored;

converting each of the speech records to a respective data record, thereby obtaining a plurality of data records;

extracting from the plurality of data records obtained, at least one group of data records, where each of the at least one group comprises two or more data records that are essentially identical to each other;

for each of the at least one group, retrieving information comprised in two or more text records associated with the two or more data records included in that group, and wherein at least two of the two or more text records are stored in different languages from each other; and storing the information retrieved in a consolidated text record, thereby obtaining a consolidated text record which comprises information that pertains to one user that has been retrieved from the two or more text records which have been stored at at least two different languages.

BRIEF DESCRIPTION OF THE DRAWING

For a more complete understanding of the present invention, reference is now made to the following detailed description taken in conjunction with the accompanying FIG. 1 which describes an embodiment of the method provided by the present invention.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a thorough understanding of the present invention. It should be apparent, however, that the present invention may be practiced without these specific details.

For the example illustrated in the flow chart of FIG. 1, let us assume that there are two databases that contain contact details of a user. One of the databases comprises a list of contact names/nicknames and their respective telephone numbers stored as Chinese text records at the user telephone device, while the other database comprises a list of text records, each text record comprising a contact name/nickname and his respective e-mail address which is written in English and stored at that user's computer (step 100). Naturally, the lists do not include the same contacts but there are some contacts that appear in both lists.

Now, in order to consolidate data that exist in both these databases so that the user's list of contacts stored at his telephone device will include the names of the contacts, their telephone numbers, and where applicable—their respective e-mail addresses, the following process is carried out.

Yet, before describing the process, it should be noted that carrying out a simple merging operation would not be effective in this example as there is no way of matching names written and stored in Chinese which appear in the telephone device memory with the names written and stored in English which appear in the computer list.

Therefore, according to the embodiment of the invention, once the two devices are being synchronized (step 110) (e.g. by an entity that has an access to both databases such as a software application which resides at either one of the devices or at remote server), from the list of text records which is stored at the telephone database, a plurality of users' identifications (contact names) is extracted (step 120) and each of these names is then converted (e.g. by using a text to speech conversion application that converts Chinese text to Chinese speech) into a corresponding of speech record, thereby obtaining a plurality of speech records which are essentially identical to the pronunciation of the respective contact names as they appear in the user's telephone list. In other words, each speech record sounds the way its respective contact name is pronounced in Chinese (step 130). According to this embodiment the procedure is repeated for the text records which are stored at the other database, the computer, where the contact names are extracted and converted into speech records (this time by using a text to speech conversion application that converts English text to English speech).

Each of the speech records is then converted into a respective data code (step 140), and the data codes are arranged in groups (step 150), where each group comprises two or more data codes from among the plurality of data codes obtained, that are essentially identical to each other. Each data code is in fact a digital code of the name of the contact that has been derived from the contact's name as pronounced in the language of the database from which it was extracted. As each group contains in this example the digital representation of the contact name as pronounced in English and a digital representation of the very same contact name as pronounced in Chinese, therefore each group may be regarded as being a group whose members are associated with text records in two different databases that pertain to the same contact.

However, it should also be noted that there could be cases where the contact name when converted to speech may sound somewhat different in two different languages, and consequently the corresponding data codes will be slightly different from each other, yet sufficiently close to each other so that they can be associated with the same group of data codes, which represents a single user.

Furthermore, according to another embodiment of the invention, there is another step that may be involved in the process by which if the contact identification is a recognized nickname in the language associated with that identification, the data codes will not be derived directly by converting the speech record of that nickname to a data code, but first the nickname will be replaced with the full name, and the latter will be converted into its respective data code. For example, if the contact name is Robert, but the identification in the computer list of this entry is Bob, according to this embodiment, the name (the text record identification) Bob will first be replaced with the name Robert, and the name Robert will then be converted from text to speech. Obviously, there could be other ways to carry out this embodiment, for example, this embodiment may be carried out for cases where no group could have been generated (i.e. there were no two or more essentially identical data codes). This may prevent the need for the conversion from Bob to Robert, if the identification of this contact is "Bob" in both databases, in Chinese and in English.

For each of the identified groups, information comprised in the respective text records associated with the data codes included in that group, is retrieved (step 160), so that in the case exemplified herein, the telephone number of the contact associated with a given group will be retrieved from the first database and the e-mail address of the very same contact will be retrieved from the second database.

The retrieved information is then stored at a consolidated text record (step 170) in any one of the databases (or in another database), thereby obtaining a consolidated text record which comprises information that pertains to one user that has been retrieved from the two or more text records, and includes in this case the contact name, his telephone number and his e-mail address.

In addition, if one of the languages (or even a third language) is selected to be the language in which the database of the consolidated text records is managed, certain information data may need to be translated into the selected language, by using for example any automatic translation program which is known in the art per se.

Although the above example describes a scenario where both databases are searched in order to generate the consolidated text records upon synchronizing the two databases, this process can also be carried out by a manual operation. For example, the owner of the telephone device may select a contact from among his contact lists whose e-mail address he wishes to obtain, in addition to the telephone number which is already stored at his telephone list. Upon triggering the suitable process according to another embodiment of the invention, the contact name will be converted into a digital code as explained above and so will the contacts included in the second database. However, in this case the result of the data codes' matching process (i.e. identifying the members to generate therefrom the appropriate groups) will yield only one group, the group whose members are associated with the contact whose e-mail address need to be retrieved. In the alternative, the identification of a contact may be done by using a characterizing feature thereof, other than his name or nickname. Such a feature could be for example defining the name of the company (instead of a contact's name) with which one or few of the contacts are associated. Let us assume that the owner of the telephone device inputs the name "Oracle"® as the identification of the contacts which he wishes to include in the consolidated text record. In such a case, the members of the group that will be generated according to the method provided by the present invention will all be contacts for which the working place has been defined in the database as Oracle. According to another example, the owner of the telephone device inputs a place of residence e.g. "Tel Aviv" as the identification of the contacts which he wishes to include in the consolidated text record, so that the members of the group that will be generated will all be contacts for whom the place of residence has been defined as being Tel Aviv, and their details will be gathered in the consolidated text record.

The present invention has been described using detailed descriptions of embodiments thereof that are provided by way of example and are not intended to limit the scope of the invention in any way. For example, although the invention has been illustrated in connection with information derived from a plurality of different databases, it also applies to one database where some of the entries are stored in one language while others in a different language.

The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for consolidating data retrieved from different text records associated with a user, wherein the text records have been stored in different languages in at least one database, and wherein the data being consolidated pertain to a single user, said method comprises the steps of:
providing at least one database configured to store a plurality of text records, where each text record comprises information associated with a respective user, and wherein at least two of the stored text records are stored in different languages;
extracting a plurality of users' identifications from the plurality of text records stored in said at least one database, wherein said plurality of text records comprises the at least two of the stored text records that are stored in different languages;
converting each of the plurality of user identifications into a corresponding speech record, wherein each speech record being a data record that comprises a digital representation of a corresponding user identification as pronounced in a language at which its respective text record has been stored;
arranging said plurality of data records in at least one group of data records, where each of the at least one group comprises two or more data records retrieved from among said plurality of data records, that are essentially identical to each other;
for each of the at least one group, retrieving from said at least one database information comprised in two or more text records, wherein the two or more text records comprise information in at least two different languages, and wherein said two or more text records are associated with the two or more data records included in that group; and
storing the information retrieved in a consolidated text record, thereby obtaining a consolidated text record which comprises information that pertains to one user that has been retrieved from the two or more text records.

2. The method of claim 1, wherein some of the plurality of text records are stored at a first database whereas others of the plurality of text records are stored at a second database, and wherein at least one of the groups of data records comprises one data record that is associated with a text record stored at the first database and at least one other data record that is associated with a text record stored at the second database.

3. The method of claim 1, wherein some of the plurality of text records are stored in a first language whereas others of the plurality of text records are stored in a different language, and wherein at least one of the groups of data records comprises one data record that is associated with a text record stored in the first language and at least one other data record that is associated with a text record stored in the different language.

4. The method of claim 1, further comprising a step of identifying the language in which at least one of the plurality of text records has been stored, prior to carrying out the step of extracting the plurality of users' identifications.

5. The method of claim 4, wherein the step of identifying the language comprises identifying a combination of characters comprised in one or more of the plurality of text records.

6. The method of claim 1, wherein the plurality of text records includes one text record that pertains to a selected user and the remaining text records comprise at least one other text record that pertains to the same selected user.

7. A system for consolidating data retrieved from different text records, each associated with a user, wherein the text records have been stored in different languages at at least one database, and wherein the data being consolidated pertain to a single user, the system comprising:

at least one database configured to store a plurality of text records, each of which comprises information associated with a specific user and comprises an identification thereof, and wherein at least two of the stored text records are stored in different languages, one or more processors operative to:

extract a plurality of users' identifications from the plurality of text records stored in said at least one database, wherein said plurality of text records comprises the at least two of the stored text records that are stored in different languages;

convert each of the plurality of user identifications into a corresponding speech record, wherein each speech record being a data record that comprises a digital representation of a corresponding user identification, as pronounced in a language at which its respective text record has been stored;

convert each of the speech records to a respective data record, thereby obtaining a plurality of data records, each comprising a user identification;

arrange said plurality of data records in at least one group of data records, where each of the at least one group comprises two or more data records retrieved from among said plurality of data records, that are essentially identical to each other;

for each of the at least one group, retrieve from said at least one database information comprised in two or more text records, wherein the two or more text records comprise information in at least two different languages, and wherein said two or more text records are associated with the two or more data records included in that group; and initiate storage of the information retrieved in a consolidated text record, thereby obtaining a consolidated text record which comprises information that pertains to one user that has been retrieved from the two or more text records.

8. The system of claim 7, wherein some of the plurality of text records are stored at a first database whereas others of the plurality of text records are stored at a second database, and wherein at least one of the groups of data records comprises one data record that is associated with a text record stored at the first database and at least one other data record that is associated with a text record stored at the second database.

9. The system of claim 7, wherein some of the plurality of text records are stored in a first language whereas others of the plurality of text records are stored at a second language, and wherein at least one of the groups of data records comprises one data record that is associated with a text record stored at the first language and at least one other data record that is associated with a text record stored at the second language.

10. The system of claim 7, wherein said one or more processors are further operative to identify the language at which at least one of the plurality of text records has been stored, prior to carrying out the step of extracting the plurality of users' identifications.

11. The system of claim 10, wherein said one or more processors are operative to identify the language comprises identifying a combination of characters comprised in one or more of the plurality of text records.

12. The system of claim 7, further comprising a user interface to enable a user to select a text record which pertains to a selected contact and wherein the plurality of text records includes at least one other text record that pertains to the same selected user.

13. The system of claim 7, wherein said data records are data codes.

14. A non-transitory computer-readable storage media storing one or more sequences of instructions which when executed cause one or more processors to perform:

extracting a plurality of users' identifications from a plurality of text records stored in at least one database, wherein at least two of said plurality of text records comprising each information associated with a specific user and comprises an identification thereof, and wherein said at least two text records are stored in different languages;

converting each of the plurality of user identifications into a corresponding speech record, wherein each speech record being a data record that comprises is a digital representation of a corresponding user identification, as pronounced in a language at-which its respective text record has been stored;

converting each of the speech records to a respective data record, thereby obtaining a plurality of data records;

arranging said plurality of data records in at least one group of data records, where each of the at least one group comprises two or more data records retrieved from among said plurality of data records, that are essentially identical to each other;

for each of the at least one group, retrieving information comprised in two or more text records, wherein the two or more text records comprise information in at least two different languages, and wherein said two or more text records are associated with the two or more data records included in that group; and storing the information retrieved from said at least one database in a consolidated text record, thereby obtaining a consolidated text record which comprises information that pertains to one user that has been retrieved from the two or more text records, and which have been stored at at least two different languages.

* * * * *